Dec. 4, 1934.  W. M. WHITAKER  1,983,423
INSECT DESTROYER
Filed June 4, 1934
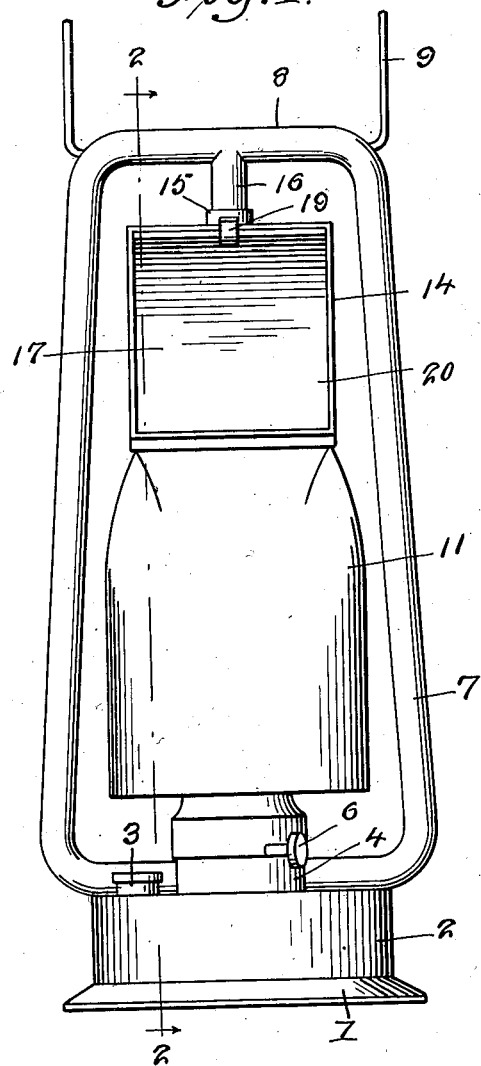
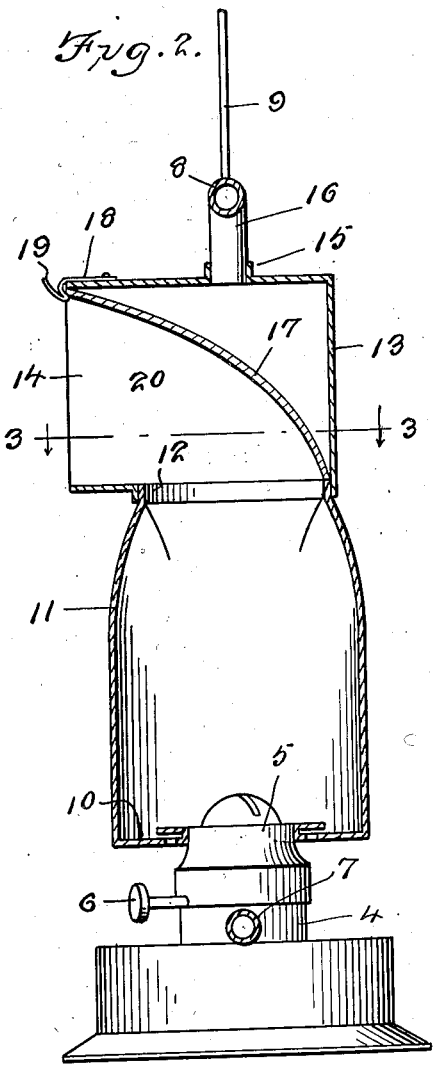
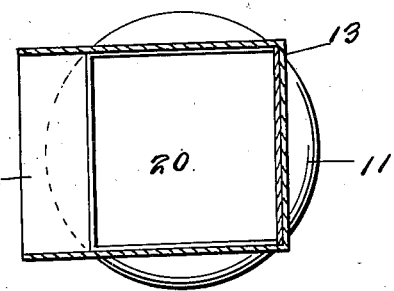
W. M. Whitaker INVENTOR
BY Victor J. Evans & Co.
ATTORNEY Patented Dec. 4, 1934

1,983,423

UNITED STATES PATENT OFFICE 1,983,423

INSECT DESTROYER

William M. Whitaker, Hemphill, W. Va.

Application June 4, 1934, Serial No. 729,000

5 Claims. (Cl. 43—113)

This invention relates to insect destroyers and its general object is to provide a trap that includes illuminating means to attract and entice flying insects and the like to the trap where they will be destroyed by the flame of the illuminating means, heat and suffocation, with the result escape of the insects is practically impossible, yet they can be removed from the trap in an easy and expeditious manner.

Another object of the invention is to provide an insect destroyer in the form of a lantern that includes a handle, so that it can be carried from place to place in a convenient manner.

A further object of the invention is to provide an insect destroyer of the character set forth that is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a front view of the device which forms the subject matter of the present invention.

Figure 2 is a sectional view taken approximately on line 2—2 of Figure 1 looking in the direction of the arrows.

Figure 3 is a sectional view taken approximately on line 3—3 of Figure 2 looking in the direction of the arrows.

Referring to the drawing in detail, it will be noted that my insect destroyer is in the form of a lantern and includes a base 1 that has formed or otherwise secured thereto an oil reservoir 2 the latter including the usual filling spout 3 that is provided with a cap, as will be apparent. The oil reservoir has formed thereon and rising centrally therefrom a collar 4 that supports a burner 5, the wick of which is adjusted by a handle 6, through the instrumentality of suitable mechanism not shown.

Secured to the collar 4 and extending from diametrically opposite sides thereof are the lower ends of a frame 7 that includes upright arms joined at their upper ends by a cross piece 8, which has pivotally secured thereto a handle 9.

My device includes a chimney in the form of a housing which is preferably made from metal and includes a bottom 10 having a centrally arranged opening therein to receive the burner 5 for fitting engagement therewith, so that the chimney rests upon the burner, as best shown in Figure 2. The upper end of the chimney, which for distinction is indicated by the reference numeral 11, is shaped to provide a square corner flange 12.

Supported upon the flange 12 is a receptacle like member 13 having a mouth 14 and the upper wall of the member 13 is provided with an opening having a collar 15 disposed about the edge thereof to receive the lower end of a member 16 that depends from the cross piece 8, so that the member cooperates with the flange 12 in securing the receptacle like member in position.

Arranged in the receptacle like member is an arched plate 17 which is in the form of a mirror, in that it has a reflecting surface that overlies the burner, as best shown in Figure 2, and the plate 17 is removable, but is held in position by a spring latching means 18 which in fact is a leaf spring fixed to the top wall of the receptacle like member and provided with a hooked free end to receive the upper edge of the arched plate, and the free end terminates in a finger piece 19. The lower end of the arched plate engages the rear portion of the flange 12, therefore it will be seen that the plate can be readily removed for cleaning, or in the event it should become damaged.

From the above description and the disclosure in the drawing, it will be obvious that I have provided an insect destroyer that includes illuminating means in the form of a burner and a reflecting surface, the latter being disposed within the receptacle like member 13 which has an open end providing an inlet for the device, and the plate 17 is not only arranged above the burner but is disposed to provide a passage 20 for directing the insects to the chimney and the burner within the same.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. An insect destroyer comprising a burner, a housing disposed about the burner and being in the form of a chimney, a receptacle like member disposed on the housing and in communication therewith, reflecting means disposed in the receptacle like member and providing an inlet passage to the housing, said reflecting means being disposed above the burner, and inlet means for the receptacle like member.

2. An insect destroyer comprising a burner, a housing disposed about the burner and rising therefrom, a receptacle like member supported upon the upper end of the housing, a reflector in the receptacle like member and providing an inlet passage to the housing, means for detachably securing said reflector above the burner, and inlet means included in the receptacle like member.

3. An insect destroyer comprising a base, an oil reservoir secured to and rising from the base, a burner associated with the oil reservoir, a housing in the form of a chimney supported upon the burner, a flange formed on the upper end of the housing, a receptacle like member received by the flange to rest upon the housing and having an open end to provide inlet means, reflecting means arranged in the receptacle like member and disposed above the burner, means for detachably securing the reflecting means in position to provide an inlet passage to the housing, a frame included in the destroyer, and a handle connected to the frame.

4. An insect destroyer comprising a base, an oil reservoir secured to and rising from the base, a collar formed with the oil reservoir, a burner supported by the collar, a housing in the form of a chimney supported by the burner and having a flanged upper end, a receptacle supported upon the housing and having an open end providing an inlet means, and an arched plate having a reflecting surface overlying the burner, said arched plate providing an inlet passage to the housing, a frame connected to the collar and disposed about the housing and receptacle like member, and a handle pivotally mounted on the frame.

5. An insect destroyer comprising a base, an oil reservoir connected to the base, a collar resting upon the oil reservoir, a burner supported on the collar, a housing in the form of a chimney supported upon the burner and having a flange at its upper end, a receptacle like member received by the flange and in communication with the housing, inlet means for the receptacle like member, an arched plate providing an inlet passage for the housing and having a reflecting surface disposed above the burner, means for detachably securing the arched plate within the receptacle like member, a frame secured to the collar and disposed about the housing and receptacle like member, means depending from the upper portion of the frame and engageable with the receptacle like member for holding the latter in operative position, and a handle pivotally secured to the frame.

WILLIAM M. WHITAKER.